Patented Mar. 20, 1934

1,951,392

UNITED STATES PATENT OFFICE 1,951,392

MANUFACTURE OF BALLS

Sidney M. Cadwell, Grosse Pointe, Mich., assignor to Revere Rubber Company, Providence, R. I., a corporation of Rhode Island No Drawing. Application September 2, 1931, Serial No. 560,881

7 Claims. (Cl. 154—17)

It has been the aim of golf ball manufacturers to produce a ball with the toughest kind of cover in order to enable it to withstand the gruelling punishment inflicted by iron and steel clubs when the edge of such clubs is brought into contact with the ball. Even when a ball is properly hit by the face of a club, it is likely to be cut or knocked "out of round" by a powerful blow unless the cover is extremely tough and is bonded securely to the tensioned windings of the core. Toward the end of securing toughness, unvulcanized balata, either alone or mixed with small amounts of rubber stocks, has been generally used, the stock being molded over the wound core under pressure.

This type of unvulcanized balata cover, while an improvement in toughness and hardness over cover materials previously used, still does not possess the maximum toughness and hardness desired, and it is apt to be deformed and cut under the conditions of ordinary usage.

Balata is toughened and hardened by vulcanization, and it is possible to incorporate vulcanizing ingredients requiring a high temperature for vulcanization into the balata stock, and mold the stock around the wound core by means of heat and pressure. However, if sufficient heat be applied to cause proper vulcanization of such a material, the balata cover initially softens into a flowable consistency, to such an extent that the rubber thread core is no longer centered in the cover. An additional objection to this procedure is that the heat softens the vulcanized thread of the rubber core so that its tension is released and the ball becomes soft and lacking in the desired liveliness. Such heat also tends to cause overvulcanization of the rubber thread, which is undesirable.

It has also been proposed to incorporate in the balata cover sulphur and one of the more modern high powered accelerators of vulcanization, in order that vulcanization of the cover may be accomplished at lower temperatures and in shorter times, so as to avoid overheating and injury of the rubber thread of the core. However, the use of such accelerators involves many difficulties. In the first place, such accelerators tend to scorch or prevulcanize the stock while it is being manipulated on the mill, and as balata is a very expensive material and competition amongst golf ball manufacturers is very severe, it is obvious that no waste of this expensive material can be permitted. In order to partially avoid or reduce this trouble, various expedients are adopted such as using two separate batches of the balata compound, one containing sulphur but no accelerator, while the other batch contains the accelerator, but no sulphur, the two batches then being mixed just prior to use. However, this involves additional expense, time and labor and does not permit the mixing up of large complete batches some time in advance, which is often desirable in factory practice. Moreover, in making the covers, two semi-spherical halves are first molded under heat, and in this operation the heat tends to cause further prevulcanization, due to the high powered vulcanizing ingredients in the stock, and hence these halves cannot be made up in any great quantity in advance, and any which are not used at once become scrap because if slight vulcanization occurs in the halves, they will no longer properly unite in the final molding operation, to or around the rubber thread core. In addition, all scrap from stock containing such high powered vulcanization combinations becomes waste as it prevulcanizes to a sufficient extent to prevent its reuse. Also in the final molding operation, which is to unite the cover halves on the ball and give the desired surface marking on the cover, it is inevitable that a certain percentage of defectively molded balls are obtained. When using the old unvulcanized balata cover, this defective molding involves no great disadvantage, because the balls can be readily remolded and a small piece of balata added wherever the mold has not properly filled out the cover, but when using a cover compound containing high powered vulcanizing combinations any defectively molded balls become "seconds", because they cannot be remolded nor can unvulcanized stock be made to properly adhere to them to fill out any defective spots in the cover.

This invention has for an object a practical process for obtaining a tough cover by curing or vulcanizing the same, which process eliminates the above described disadvantages while retaining the manufacturing advantages of the unvulcanizer cover, and which is simple and economical and free from fire hazard. The invention also aims to produce a novel article.

Other objects and advantages of the invention will more clearly appear when reference is had to the following specification and claims.

The invention comprises broadly the incorporation in vulcanizable balata-containing golf ball cover stock, of material which will not bring about vulcanization during the usual cover making and molding operations, but which is capable of reacting with a later-supplied complementary component or components to make a powerful vulcanizing combination, making and molding the cover on a ball, supplying the complementary component, and vulcanizing.

A suitable cover stock is prepared by milling the ingredients together along with material capable of reacting with a complementary component which later completes the low temperature vulcanizing combination. For instance, there may be incorporated in the stock sulphur and dibenzylamine, which latter of itself exerts little, if any, accelerating action, but the stock which contains it may be later subjected to the action of another compound such as carbon disulphide, to form a powerful vulcanizing combination within the stock so that it may be vulcanized at low temperatures.

As an example of a suitable stock incorporating dibenzylamine, the following is illustrative:

| | Parts |
|---|---|
| Mechanically cleaned balata | 15 |
| Fine Para rubber | 4.5 |
| Zinc sulphide | 1.12 |
| Zinc oxide | .75 |
| Sulphur | .16 |
| Dibenzylamine | .18 |

The ingredients of the above formula may of course be replaced by equivalent materials, for instance dispersed balata may be substituted for the mechanically cleaned balata mentioned, the Para rubber may be replaced by other types of rubber, such as crepe, smoked sheet, etc., or the balata may be increased in amount so as to take the place of rubber entirely. The zinc sulphide may be replaced by other types of pigments such as titanium dioxide. Also the proportion of the various ingredients may be varied to suit requirements. It is understood that the specific formula as given is an example only of one which may be used satisfactorily in the process of this invention. Since the stock contains no high powered vulcanizing combination, it may be milled without any special precautions to prevent "scorching" or prevulcanization on the mill. Also it may be made up in large batches and stored until needed without fear of "set up" or vulcanization during storage.

After the stock has been milled, it may be sheeted out and cut into pieces whose volume is approximately one-half of the volume between the ball and the cover mold, and molded into hollow hemispheres for application to the ball. Since these half cover elements cannot prevulcanize they may be made up in any desired quantity and kept until needed. These hemispheres are then placed on each ball and each ball is molded for a short period, not exceeding five minutes, at a temperature sufficient to unite the halves to each other and to the ball and to form the cover markings, but not to exceed about 230° F. The balls are cooled by allowing tap water to flow through the jackets of the molds and next may be removed and placed in a refrigerator whose temperature is regulated to chill the balls to around 40° F. The molding, cooling and chilling may be done to suit convenience, but I have found that good results at close to maximum efficiency are obtained by regulating the time of this cycle of operations to occur within a period under one-half hour.

After the balls have been chilled and the stock thereby temporarily hardened they are buffed to remove the flash and brushed to remove particles of loose stock which ordinarily adheres to the balls after the buffing operation. Due to the absence of high power vulcanizing ingredients the scrap from the flash, etc. may be reused and any defectively molded balls may be remolded. The balls are now ready for the curing or vulcanizing operation.

The vulcanizing operation is accomplished by subjecting the stock to the action of material which will diffuse into it and together with the zinc oxide, amine and sulphur form a powerful vulcanizing combination. With the stock above specified, carbon disulphide may be diffused into the cover of the ball, and reacts with the dibenzylamine to form a powerful accelerator, after which the cover may then be vulcanized at temperatures and for times insufficient to injure the rubber thread winding of the ball. Other suitable amines may be used, and also other suitable diffusible complementary vulcanizing ingredients, such as well known accelerators which react with amines to form more powerful accelerators.

While the carbon disulphide may be applied in any suitable manner, it is preferred to apply it to the balata cover compound in the form of an emulsion. If applied in its liquid form it has too great a softening effect and in either liquid or gaseous form its fumes are very toxic. Moreover carbon disulphide in either liquid or gaseous state is difficult to handle on account of its great fire hazard. The emulsion is preferably dilute, say 0.2–2%, depending on the particular requirements of time and cure. The balls may be placed in an apparatus which tumbles or agitates them in the presence of the emulsion for 4 to 16 hrs. or they may be held in racks or other suitable means and the emulsion circulated around them. After this they are removed and thoroughly washed in cold water and then dried. The relative agitation of the balls to the emulsion is essential to bring the emulsified droplets of the disulphide into intimate contact with the covers for absorption therein.

After the washing treatment, the balls may be placed in a chamber and left to cure for approximately 48 hrs. at a slightly elevated temperature, say 105–115° F. at the end of which time the temperature may if desired be raised to 190–212° F. for a short period, say ½ hr. in order to hasten the completion of the cure. The covers may be cured at room temperature if given sufficient time. After the cure the balls are taken off the trays and prepared for painting as by tumbling for a few hours in benzoyl peroxide in dilute solution, for instance in acetone, the solution being from 0.2% to 2% concentration. Acetone alone may be used to remove sulphur containing bodies from the surface of the ball which bodies would otherwise precipitate the dryer or varnish used. Acetone alone, however, may be used but will take a longer time than would be the case if the benzoyl peroxide were applied therewith. After this treatment the balls are washed in water and dried preparatory to painting, which may be accomplished in the usual manner.

By this invention I am able to secure a tough cover on a golf ball without injury to the rubber thread wound core and without deleteriously affecting the characteristics of hardness and resiliency which have been developed therein by winding the vulcanized rubber threads therearound under tension. In addition the halves of the cover are integrally united about the ball without liability of the halves pulling away from each other, which is apt to occur if the stock has set up at all during the forming of the halves.

Further, a good bond between the cover and the winding core is obtained by virtue of the fact that the stock does not tend to set up and is in moldable and thermoplastic condition at the time it is molded thereupon. Scrap material formed between the halves of the mold may be utilized again as it is not vulcanized and no vulcanizing action has been initiated, and defectively molded balls may be readily remolded. The process eliminates any likelihood of the stock burning on the mill as the vulcanizing combination is not created until the subsequent carbon disulphide treatment. Carbon disulphide, which is extremely inflammable, is utilized in innocuous state and there is no danger of explosion or fire.

It will be seen that by the invention all of the manufacturing advantages of the unvulcanized cover ball are retained and at the same time the toughness of the vulcanized cover is obtained.

Obviously the invention is not limited to the specific embodiments herein disclosed but is capable of being varied in different forms such as will readily occur to those skilled in the art after the principles of this invention have been understood.

Having thus described my invention, what I claim and desire to protect by Letters Patent is:

1. The process of forming tough covers on wound golf balls comprising mixing with balata-containing cover stock a part only of a powerful vulcanizing combination, which part is incapable of causing vulcanization at milling and molding temperatures, molding a cover of said mixed stock around the wound core of the ball, diffusing into the cover a chemical which completes said combination by reaction with a part thereof to form a powerful accelerator, partially curing the cover at slightly elevated temperatures and then substantially completing vulcanization by further elevating the temperature.

2. The process of forming tough covers on wound golf balls comprising mixing with balata-containing stock a part of a powerful vulcanizing combination, which part is incapable of causing vulcanization at milling and molding temperatures, molding a cover of said stock around the wound core of the ball, diffusing into the cover a chemical which completes said combination by reacting with an ingredient thereof to form a powerful accelerator, and then curing the ball at slightly elevated temperature.

3. The process of forming tough covers on wound golf balls comprising mixing with balata containing cover stock a part of a powerful vulcanizing combination, which part is incapable of causing vulcanization at milling and molding temperatures, molding a cover of said stock around the wound core of the ball, diffusing into the cover of the ball, from an aqueous dispersion of a chemical which completes the said combination, and then subjecting the covered ball to heat.

4. The process of forming tough covers on wound golf balls comprising incorporating dibenzylamine, sulphur and zinc oxide in the cover stock, molding said stock on the wound core of the ball, subjecting the ball to the action of carbon disulphide in the form of an emulsion by relative agitation between the ball and said emulsion, removing the ball from contact with said emulsion, washing the same, and subjecting it to heat.

5. The process of forming tough covers on wound golf balls comprising incorporating dibenzylamine in the cover stock, molding said stock on the wound core of the ball, diffusing carbon disulphide from an emulsion into the ball, washing the ball and then subjecting the same to the action of heat.

6. The process of covering wound cores with balata-containing stock, which comprises preparing such a stock containing sulphur, molding a cover of it on the ball, forming an accelerator of vulcanization in the cover after completion of the ball, and vulcanizing and painting.

7. The process of manufacturing golf balls comprising molding on a wound core a cover of balata-containing stock comprising sulphur, zinc oxide, and an ingredient capable of forming a high powered accelerator, removing excess stock, completing the vulcanizing combination in the cover by diffusing into the cover an ingredient capable of reacting with said first named ingredient to form a powerful accelerator, and then vulcanizing the ball.

SIDNEY M. CADWELL.